Oct. 20, 1970  J. R. BUTA  3,535,008
ROLLING MILL ROLL BEARING RETAINER
Filed Dec. 5, 1968  3 Sheets-Sheet 1
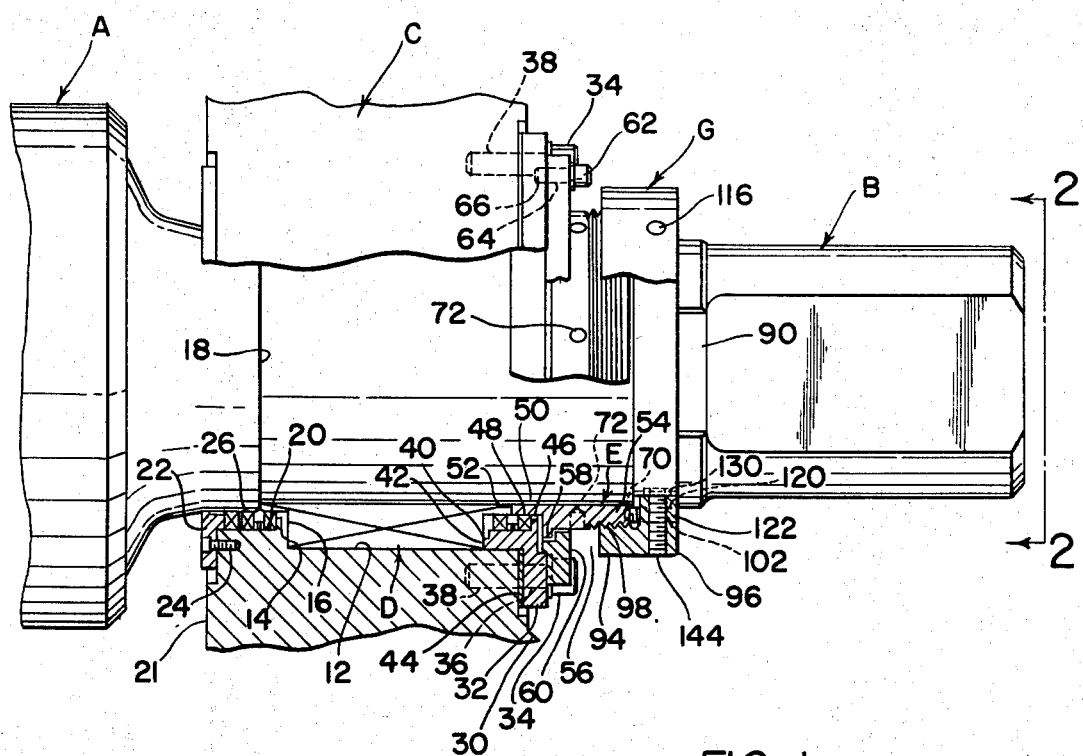
FIG. I
INVENTOR.
JOHN R. BUTA
BY
Meyer, Tilberry & Body
ATTORNEYS Oct. 20, 1970

J. R. BUTA 3,535,008

ROLLING MILL ROLL BEARING RETAINER

Filed Dec. 5, 1968

INVENTOR.
JOHN R. BUTA

BY
Meyer, Tilberry & Body

ATTORNEYS

Oct. 20, 1970     J. R. BUTA     3,535,008

ROLLING MILL ROLL BEARING RETAINER

Filed Dec. 5, 1968     3 Sheets-Sheet 3

INVENTOR.
JOHN R. BUTA

BY
Meyer, Tilberry & Body
ATTORNEYS

United States Patent Office 3,535,008
Patented Oct. 20, 1970

3,535,008
ROLLING MILL ROLL BEARING RETAINER
John R. Buta, Salem, Ohio, assignor, by mesne assignments, to Gulf & Western Industrial Products Company, Grand Rapids, Mich., a corporation of Delaware
Filed Dec. 5, 1968, Ser. No. 781,434
Int. Cl. F16c 35/06
U.S. Cl. 308—236       10 Claims

ABSTRACT OF THE DISCLOSURE

A rolling mill roll bearing retainer includes a cylindrical collar receivable over a mill roll end neck to butt against a bearing. A cylindrical ring member is receivable over the mill roll end neck and threadedly engages the collar. The axial position of the ring relative to the collar may be adjusted by means of the screw threads. The ring has an outer end on which a radially inward extending key is formed. The mill roll end neck is formed with a circumferential groove and an axially extending channel intersecting the groove. The key is slideable axially of the neck in the channel and is rotatably slideable in the groove relative to the neck. The key bears against the outer wall of the groove to hold the collar in engagement with the bearing. The ring and collar have axially alignable holes in which a set screw may be received to lock the ring and collar together against relative rotational movement. The roll neck has a recess formed in the bottom surface of the circumferential groove at a circumferentially spaced location from the channel. The ring has a radial hole through which a set screw may be threaded to have its inner end received in the recess to prevent rotational movement of the ring and collar relative to the neck. The recess is elongated axially of the neck so that the set screw may be received in it at various axially adjusted positions of the ring relative to the collar. The collar has an outwardly extending circumferential flange between its inner and outer ends which is receivable in a space between a catch means and a bearing chock. The bearing retainer assembly has no parts which require removal in order to separate a bearing and bearing chock from a mill roll end neck.

BACKGROUND OF THE INVENTION

This application pertains to the art of rolling mills and more particularly to retainers for rolling mill roll end bearings. The invention is particularly applicable to rolling mills and will be described with particular reference thereto although it will be appreciated that the invention has broader application and may be used for retaining bearings on shafts in general instead of specifically for rolling mill rolls.

Bearing retainers for retaining bearings on rolling mill rolls have conventionally included a segmented two-piece ring member received in a circumferential groove in the neck end of a rolling mill roll. A cylindrical ring is threaded over the segmented ring and bears against a collar which in turn abuts a bearing. The cylindrical ring is threadedly adjustable on the segmented ring in order to adjustably position the collar against the bearing. One example of a retainer of this type is disclosed in U.S. Pat. 1,824,002 to Weckstein. With this type of retainer, it is necessary to completely remove the cylindrical ring and the segmented ring in order to remove a bearing and bearing chock from the neck end of a rolling mill roll. These loose parts may weigh around 100 pounds or more and are very difficult to handle. In addition, these parts are often damaged when they are completely removed from the bearing and bearing chock. Removing bearings and bearing chocks with this type of retainer is also very time consuming because of the necessity to completely separate the cylindrical ring and segmented ring from a roll neck end and bearing chock. In recent years, there has been a tendency toward removing bearing chocks from rolling mill rolls by use of mechanized machines. Such machines not only save time but also protect the chock, bearing, retainer and other assembly hardware. However, the presence of loose parts which must be completely separated from other parts make it very difficult to use mechanized machines.

SUMMARY

In accordance with the present invention, the end neck of a rolling mill roll has an inner shoulder formed thereon and an outer circumferential groove formed therein. A bearing and bearing chock assembly is received on the end neck with the inner end of the chock positioned adjacent the circumferential groove. A retainer for retaining the bearing and bearing chock on the end neck includes a substantially tubular cylindrical collar received on the end neck. The collar has an inner end adapted to abut the outer end of the bearing. The collar also has an outer end defining a ring attaching end portion. A substantially tubular cylindrical ring is also received on the end neck. The ring has an inner end for attachment to the collar and an outer end for attachment to the end neck. The outer end of the ring has a radially inward projecting key which is adapted to slide axially of the end neck in an axial channel formed in the end neck. The channel intersects the circumferential groove in the end neck and the key on the outer end of the ring is also adapted to slide in the circumferential groove rotationally of the end neck. The outer end of the collar has exterior screw threads formed thereon and the inner end of the ring has interior screw threads formed thereon. The screw threads are adapted to be interengaged and the ring and collar may be rotated relative to one another for adjusting the relative axial position of the ring with respect to the collar. The ring is rotatable to a position circumferentially spaced from the channel in the end neck so that the key has its outer surface bearing against the outer wall of the circumferential groove. In this manner, the collar is held against the bearing. The ring may have axially extending holes therethrough for receiving a set screw which cooperates with an axial recess in the collar to prevent relative rotation between the ring and collar once they have been adjusted. The bottom surface of the circumferential groove in the end neck may also have a recess therein at a circumferentially spaced position from the channel. The recess in the end neck is preferably elongated axially of the neck so that it has a length dimension which is substantially greater than its width dimension laterally of the neck. A radially extending hole through the ring is adapted to receive a set screw which cooperates with the recess in the end neck to prevent relative rotation between the ring and end neck. The collar may also have an outwardly extending circumferential flange which is received in a space between the outer end of the bearing chock and a barrier member secured to the chock. The bearing retainer assembly of the present invention need not be disassembled in order to change bearings and there are no loose pieces so that assembly and disassembly of bearings from the end of a rolling mill neck is much simplified over prior arrangements.

It is a principal object of the present invention to provide a bearing retainer which is very simple to install and remove.

It is another object of the present invention to provide such a bearing retainer which has no separate loose pieces which must be disassembled in order to install or remove a bearing assembly.

It is a further object of the present invention to provide such a bearing retainer having only two main elements which may be readily adjusted and locked in an adjusted position.

It is an additional object of the present invention to provide such a bearing retainer with a simplified arrangement for holding the retainer onto a rotatable shaft against both axial and rotational movement relative to the shaft.

It is another object of the present invention to provide such a bearing retainer which is releasably held to a bearing chock assembly so that the chock assembly and retainer may be removed and installed as a single assembly unit.

BRIEF DESCRIPTION OF THE DRAWING

The invention may take physical form in certain parts and arrangements of parts, a preferred embodiment of which will be described in detail in this specification and illustrated in the accompanying drawings which form a part hereof.

FIG. 1 is a top plan view of a rolling mill end neck having a bearing and bearing chock assembly thereon and retained in position by the retainer assembly of the present invention, and with portions cut away and in section for clarity of illustration;

DESCRIPTION OF THE PREFERRED EMBODIMENT

Figure 3:
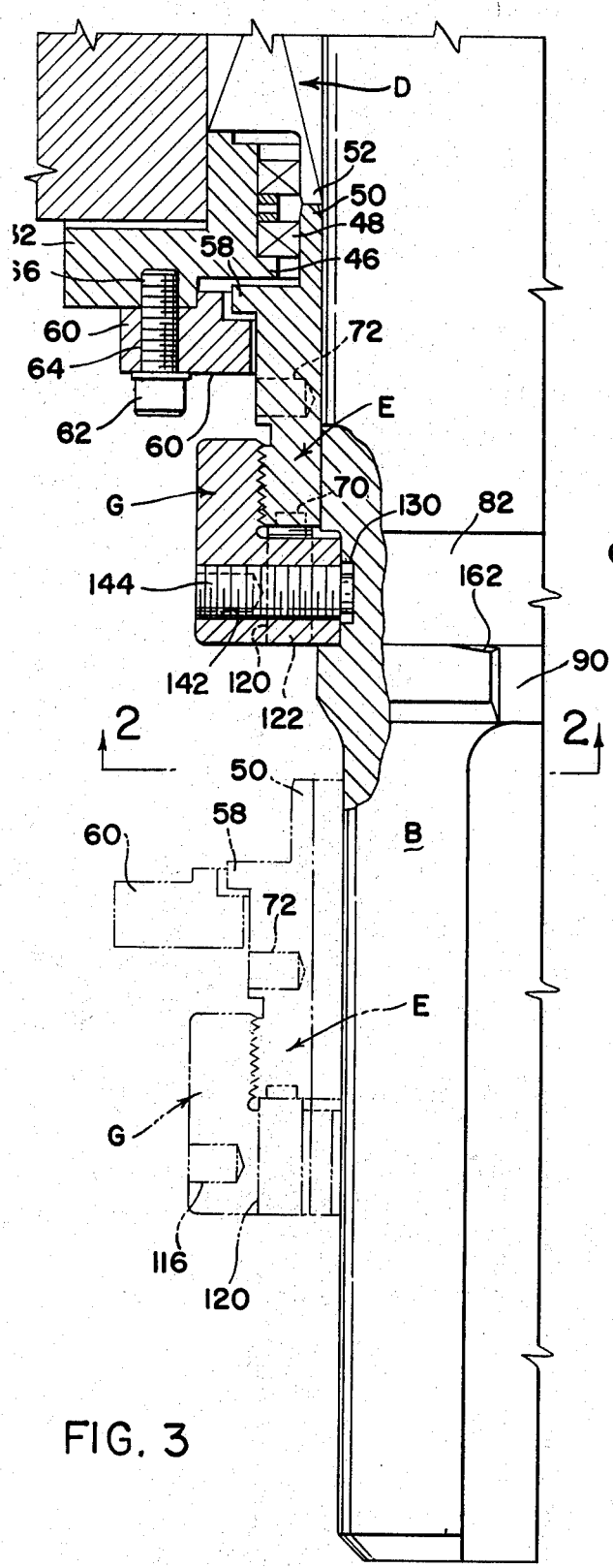
FIG. 3 is a cross-sectional elevational view taken in a direction of arrows 3—3 of FIG. 2.
Figure 2:
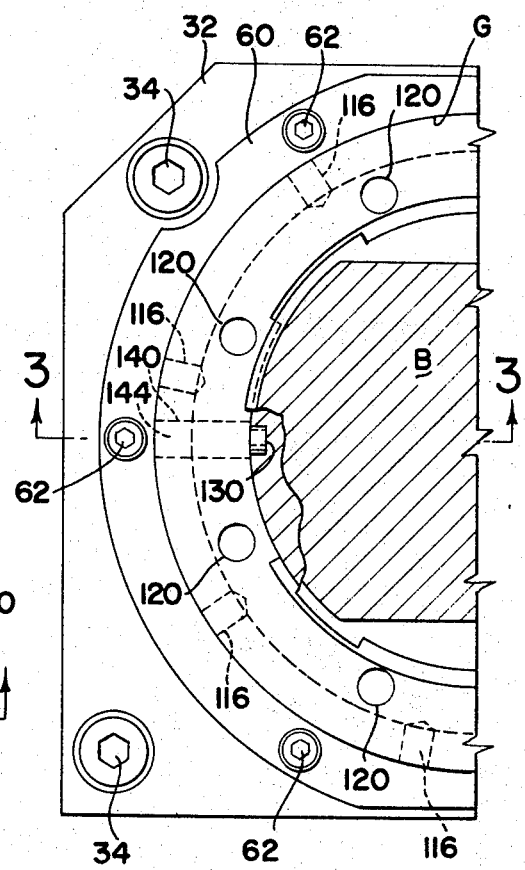
FIG. 2 is an elevational view looking in the direction of arrows 2—2 of FIG. 1 and with portions cut away for clarity of illustration.
Figure 5:
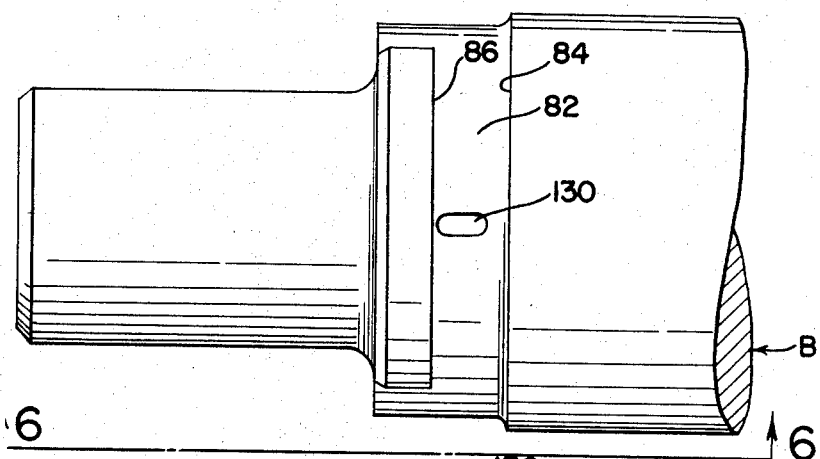
FIG. 5 is a plan view of a rolling mill roll end neck for use with the retainer of the present invention.
Figure 6:
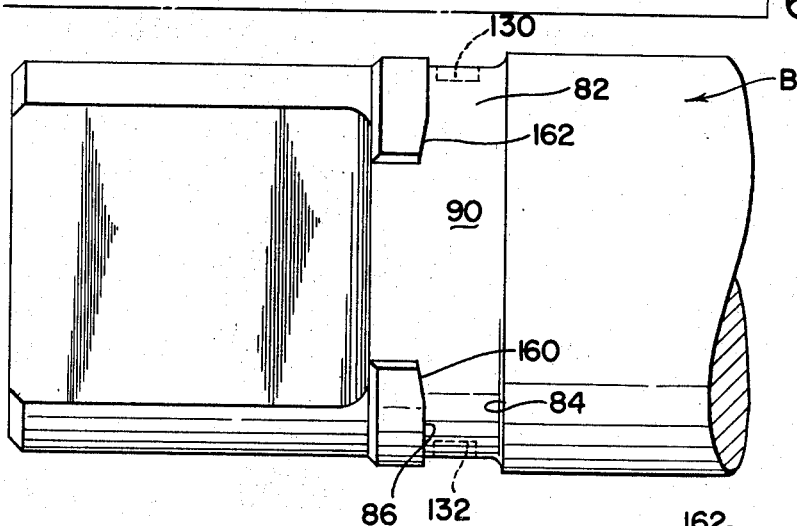
FIG. 6 is a side elevational view taken in the direction of arrows 6—6 of FIG. 5.
Figure 4:
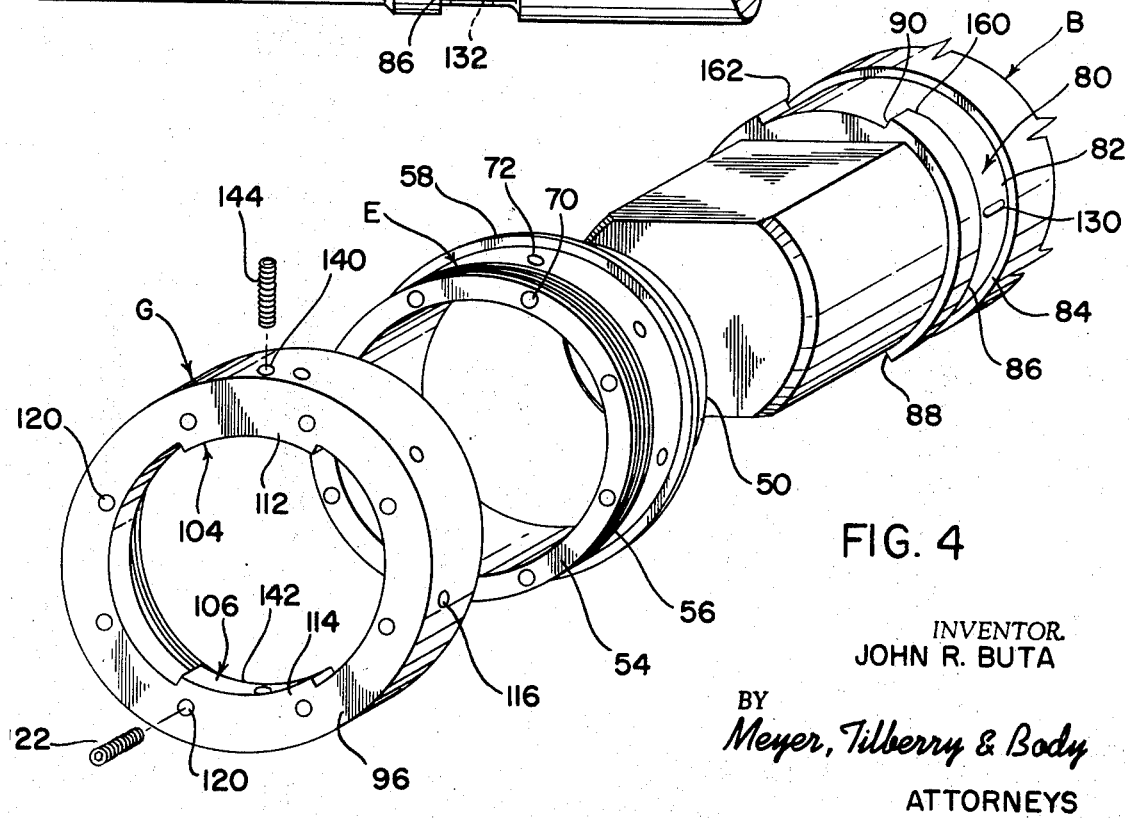
FIG. 4 is an exploded perspective view of a rolling mill roll end neck and the bearing retainer of the present invention.

Referring now to the drawings, wherein the showings are for purposes of illustrating the preferred embodiment of the invention only and not for purposes of limiting same, FIG. 1 shows a rolling mill roll A having an end neck portion B on which a bearing and bearing chock assembly C is mounted. Bearing chock assembly C is adapted to be mounted in a window or solt in the standard or end frame of a rolling mill machine in a conventional and well known manner.

Bearing chock C has an inner cylindrical bore 12 in which a roller bearing D is positioned. Bearing D is a conventional tapered roller bearing commonly used in rolling mill bearing chocks and includes an inner race and an outer race between which tapered rollers are positioned. Bore 12 in chock C has an inner shoulder 14 against which the inner end 16 of the outer race on bearing D abuts. End neck B of rolling mill roll A has an inner shoulder 18 against which the inner end 20 of the inner race on bearing D abuts. Inner end 21 of bearing chock C has a circumferential guard 22 secured thereto as by bolts 24 to hold grease seals as at 26.

Outer end 30 of bearing chock C has a circumferential abutment 32 secured thereto as by bolts at 34 which extends through a hole 36 in abutment 32 and into a threaded bore 38 in bearing chock C. Abutment 32 has an inwardly projecting flange 40 which bears against the outer end 42 of the outer race of bearing D. Shims as at 44 may be positioned between abutment 32 and outer end 30 of bearing chock C to accurately position flange 40 against outer end 42 of the outer race on bearing D. Abutment 32 further includes an inwardly extending circumferential flange 46 which defines a guard for holding grease seals as at 48 in position. A substantially tubular cylindrical collar E is received over end neck B of roll A. Collar E has a first axial end 50 which defines a bearing engaging end portion and engages against the outer end 52 of the inner race on bearing D. Collar E has an outer second axial end defining a ring attaching end portion 54. Second end 54 of collar E has screw threads 56 formed on the outer surface thereof. Collar E also has a radially outward extending circumferential flange 58 positioned between first and second ends 50 and 54. A circumferential barrier member 60 is secured to the outer surface of abutment 32 as by bolts at 62 in FIG. 3 which pass through suitable holes 64 in barrier 60 for threaded reception in suitable axial bores 66 in abutment 32. Barrier member 60 and abutment 32 cooperate to define a circumferential space in which flange 58 on collar E is received. The space is preferably wide enough so that neither the outer or side surfaces of flange 58 will contact abutment 32 or barrier 60 when collar E is properly positioned on neck B. Second end 54 of collar E has axially extending recesses formed therein as at 70 for a purpose which will be presently described. In addition, collar E may be formed with a plurality of radially extending circumferential bores 72 in its outer surface so that a spanner wrench or the like may be used to rotate collar E on shaft B or to hold collar E against rotation.

Neck B is formed with a circumferential groove 80 having a bottom surface 82, and inner and outer walls 84 and 86. A pair of channels 88 and 90 are formed axially on neck B and intersect circumferential groove 80. Channels 88 and 90 are formed to such a depth that the bottom surfaces of the grooves coincide with the bottom surface 82 of groove 80.

A substantially tubular cylindrical ring member G is received on neck B. Ring G has an inner or first axial end portion 94 defining a collar attaching portion. Ring G has an outer or second axially end portion 96 defining a neck engaging portion. First end 94 of ring G has screw threads 98 formed on its inner peripheral surface for cooperation with exterior threads 56 on second end 54 of collar E. Second end 96 of ring G has a circumferential wall 102 projecting radially inward therefrom. Wall 102 has an inner peripheral surface from which a pair of oppositely disposed keys 104 and 106 project radially inward of ring G. Keys 104 and 106 have curved surfaces which lie on the circumference of a circle having substantially the same diameter as a circle on which the curved bottom surfaces of channels 88 and 90 lie. Keys 104 and 106 are laterally dimensioned to fit within keys 88 and 90 so that ring G may slide axially of neck B with keys 104 and 106 passing through channels 88 and 90.

Keys 104 and 106 have outer surfaces 112 and 114 which are adapted to bear against outer wall 86 of circumferential groove 80 when ring G is rotated relative to neck B so that keys 104 and 106 are circumferentially displaced from channels 88 and 90. Keys 104 and 106 are latherally dimensioned to readily slide in groove 80 rotationally of neck B when ring G is rotated. Ring G may be provided with a plurality of radially inward extending bores 116 in its outer surface for receiving a spanner wrench or the like to rotate ring G or hold it against rotation.

Ring G has a plurality of axially extending holes 120 formed therethrough. Holes 120 are threaded for threadedly receiving a set screw 122. Set screw 122 is longer than the axial length of ring G so that the inner end of set screw 122 may be received in a recess 70 formed in outer end 54 of collar E. In a preferred arrangement, collar E is provided with seven recesses 70 equally spaced circumferentially around end 54 while ring G is provided with eight holes 120 circumferentially spaced equally around end 96. Thus, recesses 70 are spaced apart around 51³⁄₇ degrees while holes 120 are spaced around 45 degrees. In this manner, it will be readily apparent that a recess 70 will never be any further out of circumferential alignment with a hole 120 than 6³⁄₇ degrees. When ring G is suitably adjusted relative to collar E only a further relative rotation of 6³⁄₇ degrees will bring one of recesses 70 into alignment with a hole 120 so that set screw 122 may be installed to prevent relative rotational movement between ring G and collar E. Threads 56 and 98 may be formed so that a mere 6 3/7 degree rotation will move ring G axially of collar E a mere ten-thousandths of an inch or less so that the desired adjusted position remains substantially unchanged when aligning a recess 70 with a hole 120.

Bottom surface 82 of circumferential groove 80 in neck B is formed with a pair of opposite recesses 130 and 132. Recesses 130 and 132 are preferably formed at 90 degree positions from the center of channels 88 and 90. Each recess 130 and 132 is elongated axially of neck B. For example, recesses 130 and 132 may have a length dimension axially of neck B of one inch while its width dimension laterally of neck B may be one-half inch or six-eighths of an inch. Ring G is formed with a pair of oppositely positioned holes 140 and 142 formed through outer end 96 in wall 102 radially of ring G. Holes 140 and 142 are threaded for receiving a set screw 144 which is longer than the thickness of the portion of ring G through which holes 140 and 142 are formed. Set screw 144 may be threaded into a hole 140 until its end is received in recess 130 in neck B in order to prevent relative rotation of ring G with respect to neck B. Recess 130 is elongated axially of neck B so that set screw 144 is receivable in recess 130 at slightly variable axially adjusted position of ring G with respect to neck B. In the arrangement shown, recesses 130 and 132 are formed in circumferential groove 82 at 90 degrees from the center lines of channels 88 and 90, and holes 140 and 142 are formed in ring G on the center line of keys 104 and 106. Obviously, recesses 130 and 132 could also be formed on the center lines of channels 88 and 90 or at some other position while holes 140 and 142 could be formed at 90 degree spaced positions from those shown so as to be intermediate keys 104 and 106.

In accordance with the present invention, a bearing D is assembled to a bearing chock C in a conventional manner. The bearing and bearing chock assembly is then placed over neck B of a rolling mill roll A to a position as shown in FIG. 1. Abutment member 32 and seals 48 may then be added to bearing chock C. Collar E is then placed over neck B of roll A to a position substantially as shown in FIG. 1. Ring G is then placed over neck B with keys 104 and 106 aligned with channels 88 and 90. Threads 56 and 98 on ends 54 and 94 of collar E and ring G respectively, are then brought into engagement. Ring G may be held against rotation by means of a spanner wrench or the like cooperating with bores 116 in ring G while collar E is rotated by means of a spanner wrench or the like cooperating with bores 72 in collar E. This relative rotational movement will interengage threads 56 and 98 to draw ring G axially onto collar E. This adjustment may be continued until outer surfaces 112 and 114 of keys 104 and 106 are inside of outer wall 86 of circumferential groove 80 so that ring G may be rotated relative to neck B with keys 104 and 106 sliding rotatably in circumferential groove 80. In the alternative, ring G may be threaded onto collar E before either collar E or ring G are assembled over neck B. Ring G may be threaded onto collar E a sufficient distance so that it will be certain that the assembly will slide onto neck B a sufficient distance to allow keys 104 and 106 to slide circumferentially in groove 80. Regardless of whether ring G is assembled onto collar E before the two are positioned over neck B or after collar E is on neck B, ring G may then be rotated substantially 90 degrees so that keys 104 and 106 will be positioned substantially 90 degrees from channels 88 and 90. Set screw 144 may then be screwed into hole 140 in ring G until it locks in recess 130 to prevent rotational movement of ring G relative to neck B. Collar E may then be rotated relative to ring G to an adjusted axial position relative to ring G in which inner end 50 of collar E engages with proper adjustment against outer end 52 of the outer race of bearing D. When the proper adjustment is obtained, collar E may be rotated the necessary few degrees to align a recess 70 in end 54 of collar E with a hole 120 through wall 102 of ring G and a set screw 122 screwed into hole 120 for reception in recess 70 to lock collar E and ring G against relative rotational movement. Barrier 60 may be segmented so that it can be installed after ring G is assembled onto collar E although in a preferred embodiment barrier 60 is a one-piece member which is bolted to abutment 32 before installation of ring G on collar E. Of course, barrier 60 may be placed over collar E before collar E is positioned over neck B and ring G then be screwed onto collar E so that the entire assembly of collar E, barrier 60 and ring G may be placed over neck B. Regardless of when barrier 60 is secured to abutment 32, it will be seen that flange 58 on collar E effectively retains collar E and ring G against separation from bearing chock C. When it is desired to change a roll A due to wear or other cause set screw 144 is simply loosened until its inner end is free of recess 130. The assembly of collar E and ring G may then be rotated until keys 104 and 106 are in axial alignment with channels 88 and 90. The entire assembly of bearing chock C, bearing D, collar E and ring G may then be removed from neck B. This entire assembly may then be installed on another end neck of a different roll without any separation of any other parts. It will be readily apparent that once the retainer assembly of collar E and ring G are assembled in the manner described, the entire assembly of chock C, bearing D, collar E and ring G may be changed from the end neck of one roll to another without having to again go through the described assembly procedure. If dimensions are slightly different on the new end neck of another roll it is a simple matter to simply loosen set screw 122 until it is free of recess 70 in end 54 of collar E and to rotate collar E relative to ring G in order to readjust the relative axial position of ring G with respect to collar E. In a preferred arrangement, the edges of channels 88 and 90 at the intersection with circumferential groove 80 are tapered as at 160 and 162 so that keys 104 and 106 may be somewhat cammed into circumferential groove 80 when ring G is rotated. It will be recognized that it is also possible to taper the edges of keys 104 and 106 in the same manner to provide this camming function.

It will be recognized that the cooperation of set screw 122 with hole 120 in recess 70 provides an effective locking means for locking collar E and ring G against relative rotational movement. Also, set screw 144 cooperates with hole 140 in ring G and recess 130 in groove 80 of neck B to provide an effective locking means to prevent relative rotational movement of ring G on neck B. In addition, keys 104 and 106 provide a locking means in cooperation with outer wall 86 of circumferential groove 80 to lock ring G against axial movement relative to neck B. Co-operating threads 56 and 98 on collar E and ring G respectively, provide an adjustment means for adjusting the relative axial position of ring G on collar E in order to accurately position inner end 50 of collar E against outer end 52 of the inner race of bearing D.

While the present invention has been described with reference to a preferred embodiment, it is obvious that modifications and alterations will occur to others upon the reading and understanding of this specification.

Having thus described my invention, I claim:

1. A bearing chock retainer for a rolling mill roll comprising; a substantially tubular cylindrical collar having a first axial end defining a bearing engaging portion and a second axial end defining a ring attaching portion, a substantially tubular cylindrical ring having a first axial end defining a collar attaching portion and a second axial end defining a rolling mill end neck engaging portion, co-operating adjustable securing means on said second end of said collar and said first end of said ring for securing said ring and said collar together against relative axial movement in selectively adjustable axial positions, said second end of said ring having a circumferential wall projecting radially inward therefrom and said wall having circumferentially spaced key means projecting radially inward therefrom.

2. The device of claim 1 wherein said wall on said second end of said ring has a plurality of equidistant circumferentially spaced holes therethrough and said second end of said collar has a plurality of equidistant circumferentially spaced axial recesses therein, said holes and said recesses being alignable for receiving locking means to prevent relative rotation between said collar and ring, and said holes and said recesses being unequal in number.

3. The device of claim 2 and further including radial hole means formed in said second end of said ring completely through said wall for receiving pin means to lock said ring against rotation relative to a neck end of a rolling mill roll.

4. A collar for retaining a bearing on a neck end of a rolling mill roll comprising; an elongated substantially tubular cylindrical collar having a first axial end defining a bearing engaging portion and a second axial end defining a ring attaching portion, said collar having circumferential flange means projecting radially outward therefrom between said first and second ends, said flange means having a first radial flange surface spaced inward from said first axial end and a second radial flange surface spaced inward from said second axial end having internal and external substantially cylindrical surfaces, screw threads formed on said external surface, said second axial end having a plurality of axially extending bores formed therein between said internal and external surfaces in equidistant circumferentially spaced locations, and a plurality of radially extending equidistant circumferentially spaced bores formed in said collar intermediate said second axial end and said second radial flange surface.

5. A ring for retaining a bearing on a neck end of a rolling mill roll comprising; a substantially tubular cylindrical ring having a first axial end defining a collar attaching portion and a second axial end defining a rolling mill end neck engaging portion, said first end having screw threads formed on the interior thereof and said second end having a circumferential wall projecting radially inward therefrom and terminating at an inner peripheral wall portion, said inner peripheral wall portion having key means extending radially inward therefrom, said wall having first hole means therein extending radially of said ring and second hole means in said wall extending axially of said ring.

6. A rolling mill roll having an end neck for receiving a bearing and bearing chock, said neck having an inner shoulder and an outer substantially circumferential groove defined by inner and outer substantially circumferential projections, said outer projection having channel means formed therein substantially axially of said neck and intersecting said groove, said groove having a bottom surface, and recess means formed in said bottom surface in circumferentially spaced relation to said channel, said recess being elongated axially of said neck and having a length dimension axially of said neck which is substantially greater than a width dimension laterally of said neck.

7. A rolling mill roll having an end neck portion, said neck having an inner shoulder and an outer substantially circumferential groove defined by inner and outer substantially circumferential projections, said outer projection having channel means formed therein substantially axially of said neck and intersecting said groove, a bearing and bearing chock received on said neck between said shoulder and said circumferential groove, said bearing and bearing chock having an inner end positioned adjacent said shoulder and an outer end positioned adjacent said groove, retaining means for said outer end of said bearing comprising; a substantially tubular cylindrical collar received on said neck and having a first axial end engaging said bearing and a second axial end defining a ring attaching portion, a substantially tubular cylindrical ring received on said neck and having a first axial end defining a collar attaching portion and a second axial end defining a neck engaging portion, cooperating adjustable securing means on said second end of said collar and said first end of said ring for securing said ring and said collar together against relative axial movement in selectively adjusted axial positions, said second end of said ring having key means projecting radially inward therefrom, said key means being slidable in said channel means substantially axially of said neck and being slidable in said groove rotationally of said neck, said key means being received in said groove and having an outer surface engaging said outer projection on said neck to prevent outward axial movement of said collar and bearing on said neck.

8. The device of claim 7 and further including releasable locking means for locking said ring to said collar against relative rotational movement.

9. The device of claim 8 and further including releasable fastening means for preventing rotational movement of said ring relative to said neck.

10. The device of claim 8 and further including circumferential flange means projecting radially outward from said collar between said first and second ends, and barrier means on said outer end of said bearing chock projecting radially inward toward said neck to define an axial space between said catch means and said chock, said flange means being positioned in said axial space.

References Cited

UNITED STATES PATENTS

| | | | |
|---|---|---|---|
| 1,238,218 | 8/1917 | Thompson et al. | 308—236 |
| 2,168,469 | 8/1939 | Brouwer | 308—236 |
| 3,304,139 | 2/1967 | Toth et al. | 308—236 |

FRED C. MATTERN, Jr., Primary Examiner

F. SUSKO, Assistant Examiner